United States Patent [19]

Degen et al.

[11] Patent Number: 5,395,531
[45] Date of Patent: * Mar. 7, 1995

[54] METHOD FOR FRACTIONATING A FAT COMPOSITION

[75] Inventors: Peter D. Degen, Huntington, N.Y.; Tony Alex, Kendall Park, N.J.; Joseph W. Dehn, Jr., Great Neck, N.Y.

[73] Assignee: Pall Corporation, East Hills, N.Y.

[ * ] Notice: The portion of the term of this patent subsequent to Oct. 26, 2010 has been disclaimed.

[21] Appl. No.: 952,337

[22] Filed: Sep. 28, 1992

[51] Int. Cl.⁶ .............................. B01D 6/16
[52] U.S. Cl. ..................... 210/636; 210/651
[58] Field of Search ............ 210/651, 652, 644, 636; 426/491, 522

[56] References Cited

U.S. PATENT DOCUMENTS

| | | | |
|---|---|---|---|
| 3,797,662 | 3/1974 | Titus | 210/78 |
| 3,997,447 | 12/1976 | Breton | 210/360 |
| 4,066,554 | 1/1978 | Guyer | 210/342 |
| 4,093,552 | 6/1978 | Guyer | 210/297 |
| 4,265,826 | 5/1981 | Iida et al. | 260/428 |
| 4,340,479 | 7/1982 | Pall | 210/490 |
| 4,427,552 | 1/1984 | Lieberherr | 210/741 |
| 4,439,461 | 3/1984 | Czyzewski et al. | 426/601 |
| 4,545,940 | 10/1985 | Mutoh et al. | 260/428 |
| 4,562,039 | 12/1985 | Koehler | 419/2 |
| 4,724,080 | 2/1988 | Dau et al. | 210/651 |
| 4,876,100 | 10/1989 | Holm et al. | 426/491 |
| 4,900,440 | 2/1990 | Ziegler et al. | 210/321 |
| 4,956,102 | 9/1990 | Allsing | 210/784 |
| 4,960,544 | 10/1990 | Van Putte et al. | 260/420 |
| 5,037,562 | 8/1991 | Tarves, Jr. | 210/780 |
| 5,045,243 | 9/1991 | Kuwabara et al. | 260/428 |
| 5,066,504 | 11/1991 | Asbeck et al. | 426/417 |
| 5,096,719 | 3/1992 | Gresch | 426/495 X |
| 5,143,630 | 9/1992 | Rolchigo | 210/330 X |
| 5,166,375 | 11/1992 | Suzuki et al. | |
| 5,256,437 | 10/1993 | Degen et al. | 210/651 X |

FOREIGN PATENT DOCUMENTS

| | | | |
|---|---|---|---|
| 0149399 | 9/1982 | Japan | 210/651 |
| 0034899 | 3/1983 | Japan | 210/650 |
| 2079773A | 1/1982 | United Kingdom | |
| 2110710A | 6/1983 | United Kingdom | |

OTHER PUBLICATIONS

Rebsamen, E. and Ziegler, H., Dynamic Microfiltration and Ultrafiltration in Biotechnology, *Proceedings of the World Filtration Congress IV*, 1986 (Ostend, B.).

Rebsamen, E. et al., Use of a Dynamic Filtration Method for Separation of Animal Cells, Poster Session of the 7th ESACT-Meeting held on Sep. 30th to Oct. 4th, 1985 in Baden, Austria.

*Primary Examiner*—Frank Spear
*Attorney, Agent, or Firm*—Leydig, Voit & Mayer, Ltd.

[57] ABSTRACT

A rapid method for fractionating a fat composition, such as butter, containing a mixture of fatty glycerides into two or more fractions. The method comprises heating the initial fat composition, such as butter to liquify all of the fatty glycerides contained therein and then very rapidly cooling the liquified fat compositions, to quickly obtain filterable crystals of the fatty glycerides. By selective choice of the rate of cooling and the temperature to which the liquified fat composition is cooled, it is possible to adjust the nature of the fatty glycerides that are induced to form crystals, and commensurately, to control the nature of both the resulting filtrate and concentrate, after filtration. Additionally, a method for treating fat compositions, such as raw butter, to produce treated fat having a lower bacterial content than the initail fat compositions is provided by subjecting the fat composition, in liquified form, to dynamic filtration through a microporous filter having an average pore size sufficient to reduce the bacterial content of the fat composition flowing therethrough, to yield a filtrate which has a lower bacterial content than the initial raw fat compositon and a concentrate having a higher bacterial content than the initial fat composition. More effective bacterial reduction is achieved than with other known methods.

18 Claims, 3 Drawing Sheets

FIG. 3

METHOD FOR FRACTIONATING A FAT COMPOSITION

FIELD OF THE INVENTION

This invention relates to the field of fat processing, in general, and specifically to the field of fat fractionation.

BACKGROUND OF THE INVENTION

Natural fats, such as butter, are a complex mixture of components and comprise, as major constituents, triglycerides, each being an ester of up to three fatty acid moieties and glycerol. The nature of the individual fatty acid moieties differ, depending on the source. Even from a given source, the glycerides can vary significantly from day to day and season to season. Such variability presents difficulties to the users, such as bakers, because slight changes in the constituents of a fatty ingredient may have substantial impact upon the quality and properties of the final product. Accordingly, users of such natural fat products must continually adjust formulation and process variables to accommodate such changes in the natural fat sources.

Butter, in general, because of it being an extremely varied and complex mixture of fatty acid glycerides, has indefinite properties and characteristics, such as melting point, which typically occurs over a wide temperature range. The properties and characteristics also vary with seasonal and climatic changes.

Because of such variability, it would be beneficial to have a means of providing various fat products with some degree of uniformity, to obviate the need for the user to continually monitor and adjust processing conditions. In the baking and cooking industry, it is particularly critical to have available fat components that have very narrowly defined properties, such as narrow and well-defined melting points.

Also, it is well recognized that many, if not most, natural fats that find use in consumer foods, contain substantial amounts of saturated fats. Butter is a prime example. For many consumer applications, it would be desirable to reduce the amount of saturated fat in the end product, as by reducing the amount of saturated fat in the initial fat constituent, such as butter. Thus, a general process capable of lowering the amount of saturated fat, when compared with an unprocessed natural product, such as butter, would be desirable.

Although various techniques and processes have been employed to treat natural fatty materials, such as butter, to derive fat fractions with specific characteristics, most such process do more than just alter the components of the material, they also adversely affect quality of the product, especially with respect to its taste, aroma, or texture.

When one considers butter, for example, any processed product to be acceptable to a consumer needs to maintain the flavor and texture of butter. Spreadability upon removal from the refrigerator is also desirable.

Because the saturated fats, in general, have higher melting points than unsaturated fats, through the selective removal of at least a portion of such higher-melting fats, it is possible to make a fat-fraction that is lower in saturated fats, while being spreadable, as the unsaturated fraction has a higher proportion of lower-melting components, making the same spreadable.

A number of commercial processes have been attempted to produce fractions of natural fat compositions with defined properties, as for use in the cooking and baking industry. Such processes have included short path distillation, super-critical extraction and melt crystallization, In general, the processes result in the production of a "hard" fraction containing the high melting fats, and a light fraction containing the low melting materials. When the starting material is butter, the "hard" fraction is useful in baking applications and in shortenings. The light fraction may be employed as butter.

The melt crystallization approach has found the widest acceptance, mainly because of legislative and economic issues. The principal process is known as the "Tirtiaux" process. In accordance with that process, butter is heated to a temperature of about 60° C. to melt the butter. The butter is then cooled at a very low rate of cooling, approximately 3° C. per hour, resulting in the formation of large crystals of fat, approximately 300 microns in size. A wide size distribution of particles 1–600 $\mu$m can be expected. The crystals are comprised of high melting components, the liquid being comprised mainly of the low melting component. The liquid phase contains mainly the unsaturated portion of the components. A vacuum bed filter is used to filter out the crystals, unfortunately leaving a significant amount of liquid behind with the crystals. The crystallization cycle takes approximately 20 hours to produce just one fraction from the original butterfat feed, and the entire time necessary to perform two crystallization cycles would be over 60 hours. The butter undergoing such processing also suffers significant degradation in its flavor.

In present-day processes, three steps are traditionally employed. In accordance with the first step, butter is heated and held at 60° C. to remove any previous thermal history. Nucleation and crystal growth is then induced under very closely controlled temperature conditions. This second step is very time consuming and the necessary equipment is capital intensive. This step can take from ten to eighteen hours per fractionation step. The resulting crystals are generally about 300 microns in size. Such large crystals result because of the slow growth caused by the extremely slow cooling, usually about 0.01° c./min. Fast cooling is an anathema to the Tirtiaux process, as fast cooling would result in the formation of small crystals that are difficult to filter and in fluids with very high viscosities, also making filtering and processing difficult. Subjecting the butter to long heat treatment periods can also cause the butter to loose flavor due to vaporization of smaller molecular weight flavor enhancing compounds.

Additionally, the present processing of butter requires a pasteurization step in which the butter is rendered relatively free of bacteria and other organisms. Unfortunately, the higher temperatures needed in the pasteurization process adversely affect the flavor of the butter. Further, even with the use of such high temperatures, the pasteurization process does not eliminate all undesirable bacteria. A need therefore also exists for a means for reducing the bacterial count of butter, without the need for pasteurization.

SUMMARY OF THE INVENTION

The present invention provides, for the first time, a rapid method for fractionating a fat composition containing a mixture of fatty glycerides, into two or more fractions. Further, the present method provides, for the first time, a method for fractionating a fat composition without detrimentally affecting the desirable organoleptic components of the starting fat composition.

The present method is truly surprising in view of the fact that all prior methods for fractionating fat compositions by inducing crystal formation of fatty glycerides have relied upon extremely slow cooling techniques, to obtain filterable crystals of the fat. As discussed above, such slow cooling typically takes many, many hours. It has now been discovered, however, that it is possible to rapidly cool fat compositions, such as butter, and to quickly obtain filterable crystals of the fatty glycerides.

By selective choice of the rate of cooling and the temperature to which the liquified fat composition is cooled, it is possible to adjust the nature of the fatty glycerides that are induced to form crystals, and commensurately, to control the nature of both the resulting filtrate and the concentrate, after filtration.

The present process also allows for very rapid fractionation of the fat composition. The entire time needed to cool the liquified fat composition, induce crystal formation to form a suspension of fat crystals, and remove the fat crystals by filtration can be less than one hour.

The method comprises heating the fat composition to a temperature at which all of the components are in a liquid state, cooling the liquified fat composition to a predetermined temperature at which at least a portion of the fatty glycerides are present as solids, said cooling being at a cooling rate of about 0.5° to about 5° C./min., to form a suspension of crystals of said portion of fatty glycerides, said crystals having particle sizes from about 0.1 to about 50.0 microns, and filtering the resulting suspension using dynamic microfiltration to form a first filtrate that is substantially free of said crystals and a first concentrate having an increased concentration of said crystals.

It has been found that the filtrate, that is the portion of the butter that passes through the filter, contains a higher percentage of cholesterol than the concentrate, the portion that does not penetrate the filter. Thus, by use of such a filtration, it is possible to reduce the cholesterol content of a butter fraction. Repetition of the process, using the concentrate from one filtration cycle as the feed for a second cycle can be used to further lower the cholesterol content.

In one embodiment of the present invention, the viscosity of the liquified fat composition feedstream, prior to filtration, is reduced by adding water thereto, and maintaining the fat crystals and fat droplets in a state of dilution. The amount of added water is typically not more than about 10 percent, usually from about 2 to about 10 percent, and preferably about 5 percent, by weight, based on the total weight of the feeds when the liquified fat composition is butter. The amount of water may vary for other fat compositions. If the filter is first saturated with a hydrophobic material, such as a fat, and the filtration element is then used in accordance with such an embodiment of the present invention, it is possible to rapidly filter such an aqueous dilution of the fat crystals and fat droplets, without any of the water passing into the filtrate, the water all being maintained in the concentrate.

Such a selective exclusion of water from the filtrate is possible so long as the pressure to the filter does not exceed a critical break-through pressure, at which the fat will be displaced from the filter element and the water will then pass therethrough.

A significant advantage of the present invention is that the resultant fat fractions maintain the viability of much, if not all, of the originally present olfactory and gustatory components because the butter is subjected to only a short heat treatment period.

The process is capable of producing butter fractions of comparable chemical an physical characteristics of commercial processes. The process provides for an enormous savings in processing time.

Thus, the present invention provides for the first time a butterfat fraction that possess the desirable olfactory and gustatory components of the starting butterfat composition, made by a method comprising heating the butterfat composition to a temperature at which all of the components are in a liquid state, cooling the liquified butterfat composition to a predetermined temperature at which at least a portion of the fatty glycerides are present as solids, said cooling being at a cooling rate of at least 0.5°–5° C./min., to form a suspension of crystals of said portion of fatty glycerides, said crystals having particle sizes from about 0.1–50 μm, and filtering the resulting suspension to form a first filtrate that is substantially free of said crystals and a first concentrate having an increased concentration of said crystals.

Additionally, a method for treating fat compositions, such as raw butter, to produce a treated fat composition having a lower bacterial content than the raw fat composition is provided by subjecting the fat composition, in liquified form, to dynamic microfiltration through a microporous filter having an average pore size sufficient to reduce the bacterial content of the fat composition flowing therethrough, to yield a filtrate which has a lower bacterial content than the initial raw fat composition and a concentrate having a higher bacterial content than the initial fat composition. More effective bacterial reduction is achieved than with other known methods.

DETAILED DESCRIPTION OF THE PREFERRED EMBODIMENTS

General Processing Considerations

Several factors must be considered when setting the particular conditions for any given fat fractionation. For example, the initial temperature to which the fat is heated and the time held at that temperature can vary, depending upon the composition of the particular fat. For example, some fat compositions will contain more saturated fat than others, requiring that the fat be held at the predetermined temperature for a longer period of time than for others with a lesser amount of saturated fat. Additionally, the nature of the fat will also vary the chain length of the fat, the higher molecular weight fats, in general, being of a higher melting temperature than the lower molecular weight fats.

In accordance with the present invention, it has now been found that natural fats, such as butter, when cooled, almost instantaneously generate fat crystals that are filterable. Upon quenching to a filtration temperature under appropriate conditions, it is possible to form 5 micron-size crystals, which can be removed through the use of suitable filtration processes.

Pretreatment Processing

Prior to the use of the present invention, the fat composition is usually subjected to traditional pretreatment processing, such as cleaning through the use of filtration. When butterfat is the natural product being processed, it is generally heated to a temperature, such as about 60° C., to fully melt the same and remove any thermal history, and any water may be removed by settling, drying or centrifugation. If a membrane that is saturated with a hydrophobic material is used for the separation, as discussed previously, there is no need for the separate water removal step.

The melted fat is next filtered, as through a high dirt capacity filter, such as that marketed by Pall Corporation under the trademarks Profile ® and HDC ®, to remove any extraneous solids or dirt. Such filters may be those rated as 10 micron filters.

Cooling of the Melted Fat Composition

The prefiltered melted fat composition is preferably transferred to a jacketed process vessel, where it can be rapidly cooled to the desired temperature and at the desired rate. The process vessel is maintained at the same temperature as a filtration unit, as by use of a temperature control unit and a programmable temperature controller.

Some control of the time that the melted fat composition feed is maintained at the quench temperature, or in the reactor vessel, prior to filtration, is desired, as the crystals will change in size and filtration characteristics, with time. It is generally preferred to establish a set time from initial quenching of the feed material to the time of filtration. Obviously, the time will vary from feed to feed and from equipment to equipment. As a general proposition, however, it is usual for the feed to be subjected to filtration in from about 5 minutes to about 2 hours from the time of quenching, preferably within about ten minutes, in most instances. The holding time is normally increased with decreasing pore size of the membrane filter element.

It is preferred to form crystals in such a way that they are filterable and have a fairly homogeneous size distribution. The size and size distribution of the crystals formed by cooling a fat melt depend upon the rate of cooling, temperature of holding and the holding time. The sizes of the crystals formed are normally determined by the amount of nucleation sites available, the number of nucleation sites available is, in turn, dependent on the rate of cooling. Upon cooling the fat at a fast rate, a large number of nuclei are formed, causing a large number of crystals of small sizes, such as from about 0.5 to about 2 microns in size, to be formed. The kinetics of forming small crystals is very rapid and the sizes formed are normally within a small size distribution range. The homogeneity of the crystal mass makes it easier to choose a membrane filter element for a given set of conditions.

Slow cooling produces, as used in the prior art, cause the formation of only a small number of nucleation sites, and hence fewer crystals are formed. Further slow cooling causes the crystals to grow. Crystals of the range of 10 to 800 micron are used in conventional fat fractionation processes.

Fat has an inherent capability of remaining in a supercooled state before it starts to crystallize. Quenching molten fat to a process temperature and subjecting it to immediate filtration could cause the supercooled fat to nucleate and crystallize in the pores of the filtration membrane eventually plugging up the membrane. Hence it is necessary to hold the fat at the processing temperature for a period of time before filtration. This is particularly important when using polymeric membrane filter elements of small pore sizes.

The quench rate employed may again vary widely. Initial quench rates are typically from about 0.5° to about 5° C. per minute, and preferably about 1.0° C. per minute. The quench rate, and time from quench to filtration, should be set such that the size of the crystals at the time of filtration is from about 0.1 to about 50 $\mu$m, preferably around 0.5 to 5 $\mu$m and most preferably around one micron.

It is the size of the fat crystals that is important, from the standpoint of filtration, and obviously the size that is desired will vary somewhat from equipment to equipment. Also, the composition of the fat crystals is important from the standpoint of the degree of fractionation that is desired. By cooling, through several cycles, to temperatures that are only incrementally increased a small amount from cycle to cycle, such as 5° to 10° C. per cycle, it is possible to obtain a multitude of fat fractions from a single fat source, with each fraction having narrowly definable characteristics and properties.

For butterfat, initial processing, wherein the butterfat is cooled at a rate of about 0.5° to about 5° C./min., to a filtration temperature of about 0.5° to about 30° C., a concentrate results that has a significantly larger number of higher melting triglycerides, principally stearin, as compared to the filtrate, which is principally olein.

Preferably, the butterfat is quenched to about 35° C., from a starting temperature of about 60° C., as by using cold water in the jacket of the vessel, resulting in a rate of cooling of at least about 2° C. per minute, preferably from about 3° to about 5° C. per minute, with gentle stirring being maintained. The butterfat is then cooled to about 5°–30° C., in a controlled fashion. The butterfat is held at this temperature for about 5 minutes to 2 hours.

The cooling apparatus can be a scraped surface heat exchanger, such as those available from APV Crepaco, jacketed vessels, chilling drums, such as those available from Buflovak, or other equipment, such as described in U.S. Pat. No. 4,439,461. The cooling transfer medium could be any commercially available heat transfer medium, cold water, glycol or air, depending on the particular process.

The Filtration Apparatus and Processing

The filtration apparatus may be of any suitable construction and type. As the preferred size of the fat crystals to be removed is about 1 micron, as discussed below, many different filtration devices may be suitably employed.

Types of suitable filtration membranes include porous metal filters, microporous PTFE membranes, microporous polyvinylidenefluoride membranes, and the like.

The microfilter pores are sized so as to retain the fat crystals that are present after rapid cooling, while still maintaining an acceptable flow rate through the microfilter. Useful membranes include microporous membranes with good flow properties, narrow pore size distribution and consistent bacterial removal performance for the bacteria of interest. The pore size rating of the microfilter membrane should be from about 0.1 to about 10.0 microns, as determined by those methods known in the art, the tests known as the "bubble point" (ASTM F316-86) and the $K_L$ method (U.S. Pat. No. 4,340,479). Preferably, the pore size rating will be from about 0.2 to 2 microns. Most preferably, filters are employed that have pore size ratings of about 1.0 μm. Such microporous filters are well known and are readily available.

Preferred microporous membranes that may be used in accordance with the present invention include those sold by Pall Corporation under the trademarks Ultipor $N_{66}$ ®, Fluorodyne ®, and Posidyne ®; those available from Cuno Corporation under the trademark Zetapor, and those sold by Millipore under the trademark Durapore ®.

The cylindrical membrane elements of use in the present invention include those that may be attached to a support in a leak-tight manner, in accordance with methods known in the art.

Alternatively, the filter may be made of stainless steel, having a pore size rating of about 5.0 micron or smaller, usually about 2.0 micron, as that size is readily available commercially. When a stainless steel filter is used, it may be possible for all of the processing equipment to be made of stainless steel. Such a construction is desirable because it provides for ease of cleaning and maintenance, with no contamination of product, that might adversely affect product quality. Because the stainless steel is generally available only with the larger pore size, such as about 1.0 μm, the use of the stainless steel filter usually means that the process conditions must be adjusted such that the fat crystal sizes obtained from the rapid cooling are larger than those needed when a microfiltration membrane is employed. Typically, then, longer crystallization times are necessary to achieve the end.

For porous metal filters, those stainless steel filters made in accordance with U.S. Pat. No. 4,562,039, incorporated herein by reference, are especially useful in the present process, as are those commercial products sold by Pall Corporation under the designation Pall PMM metal membrane filters, such as that designated M020 and M050, having absolute removal ratings of 2 microns and 5 microns, respectively, and 99 percent removal ratings of 0.5 micron and 2 microns.

Selection of a given filter type and size rating is dependent upon several factors, the most important of which is particle size of the fat crystals. The smaller the fat crystals, the finer the filter must be, and commensurately, the longer the filtration process time, per given surface area of the filter or membrane.

In the case of fat fractionation, the efficiency of the process is determined by the amount of feed processed per unit time and the quality of both product streams (filtrate and concentrate). Typically, it is desired that the filtrate be free of the stearin crystals and the concentrate be depleted of the olein liquid. Another major factor involved is the amount of time that the equipment can be operated between membrane cleanup cycles.

Clearly the use of dead end filtration is not adequate for the implementation of this invention, because of the formation of a cake layer of crystals on the membrane filter surface after a small amount of olein has permeated the membrane. One way to prevent the formulation of the cake layer is to entrain the crystals in a stream that moves with a relatively high velocity across the membrane surface as found in crossflow filtration schemes.

The use of pure crossflow techniques is not adequate for the present process. In crossflow schemes the concentrate stream flow is about 10 to 20 times the flow of filtrate, generating speeds of about 10 m/min across the membrane surface. Faster surface velocities are obtainable at the expense of increasing pressure drop. Higher pressure drops are inherently disadvantages to the filtration rates because the crystals tend to be packed and will agglomerate, moreover, a large amount of pumping energy is spent for nominal gain in filtrate fluxes.

In crossflow techniques, the concentrate stream is severely diluted by the liquid fraction and has to be constantly recirculated to achieve any degree of crystal concentration by successive depletion of the olein. This leads to a number of processing problems, including, increasing viscosity with each pass, higher pumping energy, melting of crystals due to the shear heat generated by constant recirculation and in general an absence of control on the concentrate quality.

Dynamic filtration is particularly suited for the current process. In dynamic filtration, the feed stream is imparted a secondary velocity component tangential to the membrane surface and orthogonal to the feed stream direction. This secondary velocity component is independent of the feed rate of the material into the filtration chamber and is controlled by the motion of the membrane filter element itself or by the motion of a surface located near the membrane filter surface. Moreover, since the secondary velocity is independent of the feed pump, much higher surface velocities can be generated without excess pressure drop or pumping energy being expended.

In a preferred embodiment, a cylindrical membrane filter element is caused to rotate along its vertical axis inside a pressure filtration chamber. The material enters the bottom of the filtration chamber and under the influence of the feed pump attains an axial velocity directed along the axis of the membrane filter element and a secondary velocity component tangentially across the membrane surface in the direction of the rotation of the membrane filter element. The material fed into the filtration chamber then moves along in a helical fashion across the membrane surface.

The tangential velocity is purely determined by the speed of rotation of the membrane filter element. Typically, the filtrate flux increases with the tangential velocity. In this process tangential velocities of 10–500 m/min are usable and 50–200 m/min are preferable. The main disadvantage of using higher tangential velocities is the shear heat generated due to the rotation of the membrane filter element. Since the amount of shear heat generated is proportional to the square of the velocity, an optimum velocity must be chosen to prevent melting the crystals in the filtration chamber. The use of a jacketed filtration chamber with coolant attachments could enable the process to be operated at higher tangential velocities without causing the crystals to melt.

Higher tangential velocities may also be used during cleanup of a plugged membrane filter element or when it is desired to obtain a concentrate cut of high melting quality.

The axial component of the velocity determines the pitch of the helical path followed by the material and hence determines the residence time of the material in the filtration chamber. By controlling the pitch of the helical path followed by the material in the filtration volume it is possible to control the quality of the concentrate. A shorter pitch provides a greater residence time in the filtration chamber and hence a greater degree of concentration. The residence time is directly related to the amount of time a unit volume of feed material contacts the membrane filter element. The larger the residence time, the larger the amount of olein that will be depleted from the concentrate and permeate the membrane filter element. Clearly, the axial velocity plays a major role in determining the quality of the concentrate stream.

Depending upon the feed material, the concentration of solids in the feed stream and the processing temperature the axial velocity can vary from 0.005 to 10 m/min.

Similar analogies can be applied to other types of dynamic filters. For example, when the filtration equipment used is a rotating disc filter the feed pump provides the axial velocity component and the rotation of a solid disc located near the membrane filter element provides the tangential velocity. Once again the permeate fluxes are controlled by the tangential velocity and the concentrate quality and production rate is controlled by the axial velocity. In this particular embodiment the material travels in a spiral of reducing radius, when the feed is introduced near the outer diameter of the disc dynamic filter.

The particular type of filtration equipment used is not important, what is important is that the fluid being filtered have two velocity components, the first controlling the filtrate flux and the second controlling the concentrate quality and production rate.

In a preferred embodiment, the filtration equipment is a dynamic crossflow microfilter, wherein the filter medium itself rotates. The preferred dynamic crossflow devices include those taught employing rotating cylindrical filters, as taught in U.S. Pat. Nos. 4,956,102; 4,900,440; 4,427,552; 4,093,552; 4,066,554; and 3,797,662. Other such devices are disclosed in U.S. Pat. No. 5,037,562 which relates to an oil/liquid dynamic separation rotating disk filter system. Another rotary disk filter is described in U.S. Pat. No. 3,997,447 and U.S. Pat. No. 4,956,102 relates to another rotating cylindrical filters. All patents referenced in the present application are incorporated herein by reference.

The melted fat may be transferred continuously to the filtration unit, as by a circulation pump. A typical circulation pressure, when employing crossflow filtration would be from about 3 to about 15 or 20 bar, preferably up to about 10 bar. At a given flow rate, the average filtrate flow rate may be from about 30 to about 80 percent of the feed flow rate, whereas the average concentrate flow is from about 20 to about 50 percent. The liquid fraction, after permeating the filter, may be recycled back to the process tank. The solid crystalline material that is retained by the filter on the concentrate side, may be pumped to a second holding tank.

The amount of solid fraction in the feed is a function of the products desired. This could vary from 2-60% depending on the aim of the particular fractionation. When a larger number of cuts of a well defined characteristics are desired the solid fat content in the feed material is maintained from about 2-10%. Lowering the solid fat content in the feed stream results in the lowering of the feed viscosity which eventually increases the processing rate. As mentioned previously, a problem with rapid cooling is that the feedstream develops very high viscosities making filtration by traditional methods difficult, if not impossible.

It has now been discovered that it is possible to reduce the viscosity of the feedstream, prior to filtration, by adding water thereto, and maintaining the fat crystals and fat droplets in a state of suspension. If the filtration element is first saturated with a hydrophobic material, such as a fat, and the filtration element is then used in accordance with the process of the present invention, it is possible to filter the aforementioned aqueous suspension of the fat crystals and fat droplets, without any of the water passing into the filtrate, the water all being maintained in the concentrate.

Such a selective exclusion of water from the filtrate is possible so long as the pressure to the filter element does not exceed a critical breakthrough pressure, at which the fat will be displaced from the filter element and the water will then pass therethrough. Such a breakthrough pressure will vary with the particular filter element pore size rating, the material form which the filtration element is comprised, the geometry of the element, the particular fat used to presoak the filter element, and the like. As a general rule, such pressure will usually be within the range of about 2 to about 20 psi. When the filter element is a 1.0 micron rated metal cylindrical filtration element, and the element has been presoaked in butter fat, the break-through pressure will be about 6 to 10 psi. Thus, as long as the pressure applied to the filter element is kept below about 8 to 10 psi, the water will not pass therethrough. An automatic check valve could be used, for example, to assure that the pressure applied to the filter element does not exceed such a predetermined level.

Such an embodiment that uses an aqueous fat suspension can be employed only when filters or membranes with relatively small pore size ratings are used. Generally, the pore size must be about 1.0 $\mu$m or less.

Exceeding the breakthrough pressure will cause the water to displace some of the oil in the membrane pores, causing the membrane to eventually plug up.

In the present embodiment where a rotating cylinder dynamic filter is used, the water permeation pressures will be higher than that rated for a static membrane, because, water is denser than the oil and tends to be forced away from the membrane surface under the centrifugal force provided by the rotation of the membrane filter element.

Addition of water will also effect the product quality, since it will displace some of the olein that has occluded in the stearin or concentrate phase. The ability of using water to operate at lower filtration pressures also prevents the crystals from forming unmanageable agglomerates.

Fat Sources

Fats, in general, contain glycerol esters of fatty acids that have acid chains that vary from $C_4$ to $C_{18}$. Butter contains acid chains from $C_4$ to $C_{18}$, with the $C_{18}$ acids being of four types, saturated or unsaturated, with from one to three double bonds being present. Vegetable fats vary quite widely, with some $C_8$ acids as the lowest chain length, as in the case of palm kernel oil, while others contain $C_{16}$ acids as their lowest acid chain length, as in the case of soybean oil. Most vegetable oils contain $C_{18}$ acids as their highest chain length constituent, whereas some vegetable oils contain fatty acids up to $C_{22}$, as in the case of peanut and rapeseed.

Fat products derived from most land-based mammals, such as lard and tallow, contain $C_{14}$ acids as their shortest chain length component, and $C_{18-20}$ as their highest. Fats derived from marine animals, on the other hand, may contain significant numbers of $C_{22}$ fatty acids, some of which may contain a high-degree of unsaturation, with up to six double bonds being present.

As can be readily appreciated, with such a wide variety of possible natural sources for fat, process variations for the fractionation of various fat products can vary widely. The fractionation process of the present invention, however, is applicable to any fatty material, regardless of source, and whether natural or synthetic.

Specific fats that may be processed in accordance with the present invention include the following:

VEGETABLE: Babassau, castor, coconut, corn, cottonseed, linseed, oiticica, olive, palm, palm kernel, peanut, rapeseed (regular and low erucic, as from canbra or canola), safflower (regular and high oleic), sesame, soybean, sunflower, rice bran, tsubaki, perilla, hemo seed, kapok, tea seed, and tung.

ANIMAL: Butter, lard, tallow

MARINE: Whale, herring, sardine and menhaden

The present invention will be illustrated through the following nonlimiting examples.

Description of Filtration Apparatus

The cylindrical dynamic micro filter (cylindrical DMF) used for these tests was a BDF-01 available from Sulzer Brothers Limited, Winterthur, Switzerland. The equipment is described by Rebsamen et al. (Dynamic Microfiltration and Ultrafiltration in Biotechnology, Rebsamen, E. and Zeigler, H., Proceedings of the World Filtration Congress IV, 1986, (Ostend, B)). See also, U.S. Pat. Nos. 4,066,554 and 4,093,552, which are incorporated herein by reference.

Description of Membrane Filter Elements Used

The membrane filter elements used in these experiments were various grades of teflon and porous metal membrane PMM® and PSS®, commercially available from Pall Corporation, Glencove, N.Y. The pore sizes used were 0.2, 0.45, 0.65, 1.0, 2.0, 5.0 and 10.0 microns. The membrane filter elements had a surface area of 0.04 m². The filter element was made by wrapping the membranes around a porous cylindrical support in a leak tight manner. The diameter of the cylinder was 0.06 m and had a length of 0.2 m. This provided a total filtration area of 0.04 m².

Methods

Method A: Melting and Cleaning of Butter

A measured amount of frozen butter was placed in a container and the contents were heated to a temperature of about 60° C. The butter was maintained at this temperature until there were no visible signs of unmelted portions. This was then left to stand for fifteen minutes. Typically three phases are formed, a bottom water rich layer, a middle oil layer and a third layer containing miscellaneous solids. The top layer is skimmed off and the oil layer is decanted into another vessel. The decanted oil is then filtered through a 10 micron HDC® filter. The filtrate was then collected and frozen until further use or maintained at 60° C. before further processing.

Method B: Temperature Treatment to Form Filterable Crystals

Method B1: A jacketed vessel of suitable size was used as the process vessel. The butter is further brought to 60° C. by circulating hot water and was held at this temperature for about ten minutes. The hot water was then displaced with a cold heat transfer fluid to lower the temperature of the butter in a desirable fashion, normally at the rate of about 0.5–5 C/min. When the temperature of the butter had reached about 90% of the process temperature the cold fluid was displaced with a fluid at a few degrees below process temperature and was held for a suitable amount of time, preferably about 30 minutes. The butter was gently stirred using an anchor type impeller throughout the process.

Method B2: Butter treated by method A is quickly quenched to −5 C and left to stand for about 15 minutes. The butter is then gently heated to process temperature using a suitable heat transfer medium.

Method B3: Butter from method A is transferred to a jacketed vessel and subjected to slow cooling. Typically the butter is cooled slowly (0.01°–0.2° C./min) in this process. This treatment is conducive to the formation of large crystals. The treatment is attained by using a heat transfer fluid in the jacket of the process vessel. The temperature of the hot water is preprogrammed using a ramp and soak type temperature controller.

Method C: Operation of the Cylindrical Dynamic Microfilter

Prior to operation the equipment was sanitized using hot caustic and then rinsed with deionized water and dried with air. A membrane filter element described in the previous section was then assembled in the cylindrical dynamic microfilter (DMF). The fluid to be filtered was pumped from the process tank into the cylindrical DMF via a positive displacement pump. The amount of concentrate was controlled by a second pump or pressure relief valve attached on the concentrate port. Temperatures and flow rates of the feed, filtrate and concentrate and the feed pressures were taken at various times during the course of the experiment, typically, in intervals of ten minutes. Standard operating conditions of the cylindrical DMF were a rotation speed of 600 rpm and a feed pressure of about 2.0–8.0 bar. All examples with this device were carried out using constant feed flow rates.

The quality and flux rate of each fraction depend upon a number of factors. These are summarized below.

| Feed characteristics | |
| --- | --- |
| $\Phi(T)$ | % solid fat content of the feed with temperature. If the feed stream is normal butteroil, the $\Phi(T)$ is defined and is designated as $\Phi'(T)$ |
| W | water concentration in volume % |
| Crystallization process | |
| Cr | cooling rate during crystallization °C./min |
| $\tau_h$ | holding time during crystallization in minutes |
| $T_2$ | temperature of holding |
| Filtration process | |
| $T_f$ | filtration temperature in °C. The fluid to be filtered is maintained at this temperature through the filtration procedure. Since some heat is generated during filtration $T_f$ is normally a few degrees higher than $T_h$ and is the steady state temperature attained in the filtration unit for a given residence time. This parameter is effected to a large part by $V_a$ and $V_r$. |

-continued

| | |
|---|---|
| $P_f$ | filtration pressure in bar. |
| $V_a$ | axial velocity m/min. |
| $V_r$ | tangential velocity m/min., purely determined by the rotation speed of the membrane filter element. As $V_r$ increases the filtrate generally increases. Increase in this component of the velocity also generate more heat. |
| | membrane pore size in μm |
| $\tau$ | average residence time of fluid in filtration chamber in minutes |

Description of Analytical Methods

Iodine Value

Iodine value, which is the measure of unsaturation in a fat sample was measured according to method Cd 1-25 of the American Oil Chemists Society.

Differential Scanning Calorimetry (DSC)

20-30 mg of fat sample was placed in an aluminum crucible. The measuring cell was purged with Helium (50 ml/min). The butter was then heated to 80° C. and held for 10 minutes to remove previous history. The sample was then cooled to −40° C. at 10° C./minute. The fusion of the crystals were monitored by heating the sample over the range −40° to 80° C. at a rate of 10° C./minute. The data reported is the integrated value of energy exchanged in joules/gram of sample at 6° C. (representing liquid fraction) and at 24° C. (representing the solid fraction).

Solid Fat Content by pulsed NMR

The solid fat content of the sample at a particular temperature is measured by pNMR using a Bruker minispec. The technique used is according to method Cd16-81 of the American Oil Chemists Society. The data reported here is the solid fat content (SFC) of the sample at 25° C.

EXAMPLES

Butterfat is heated to a temperature of about 60° C., to fully melt the same and remove any thermal history, and water is removed by settling. The melted fat is then filtered through a high dirt capacity filter, to remove any extraneous solids or dirt, by use of a 10 micron filter. The prefiltered melted butterfat is then transferred to a jacketed 10 L process vessel, where it is held for 15 minutes.

The butterfat is quenched to about 35° C., by using cold water in the jacket of the vessel, resulting in a rate of cooling of about 3° to about 5° C./minute, with gentle stirring being maintained. The butterfat is then cooled to about 28° to 30° C., in a controlled fashion. The butterfat is held at this temperature for about 30 to about 40 minutes.

The butterfat is transferred continuously to a dynamic microfilter filtration unit, by a circulation pump. The circulation pressure is about 3.6 bar. At the flow rate of 200 ml/minute, the average filtrate flow rate is about 140 ml/minute, whereas the average concentrate flow is about 60 ml/minute. The dynamic microfilter, equipped with a steel membrane having a pore size rating of 2.0, is operated at a rotor speed of 150 rpm. The liquid fraction, after permeating the filter, is recycled back to the process tank. The solid material that is retained by the filter on the concentrate side, is pumped to a second holding tank. The filtrate flux reaches a steady state of 3.0 lb/min/m².

Figure 1:
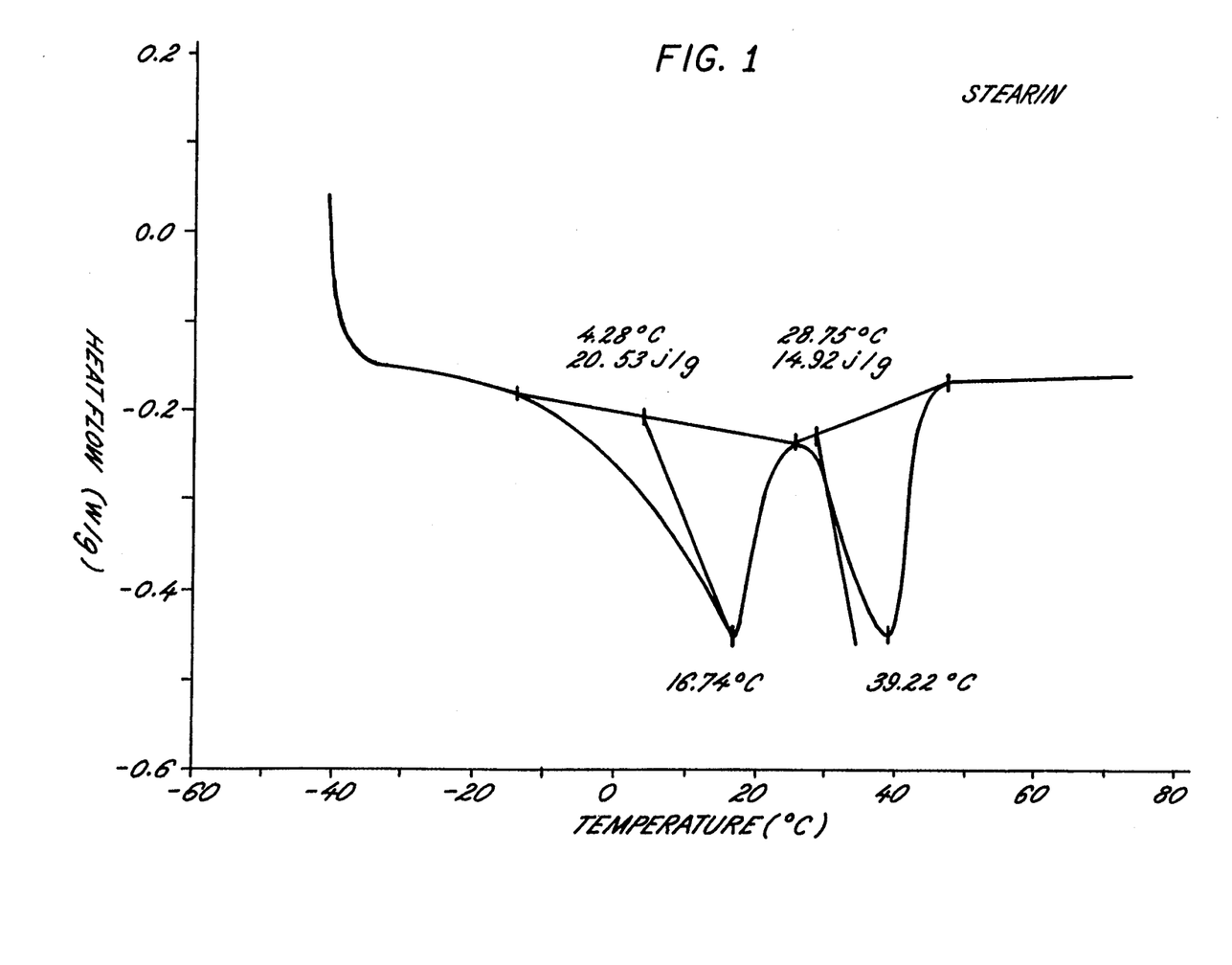
FIG. 1 is a differential scanning calorimeter plot for a stearin butterfat fraction obtained in accordance with the present invention.
Figure 2:
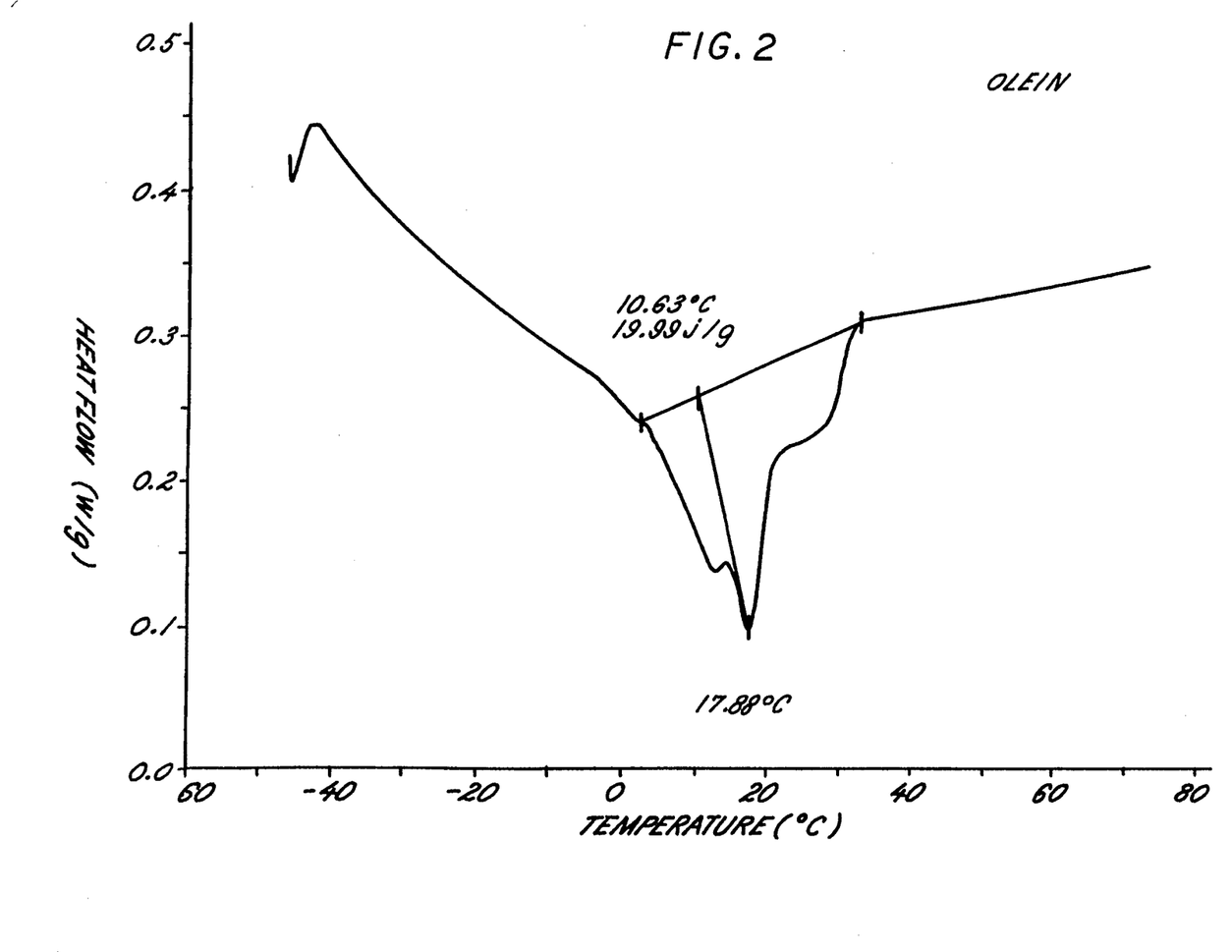
FIG. 2 is a differential scanning calorimeter plot for a olein butterfat fraction obtained in accordance with the present invention.

The concentrate that has a significantly larger number of higher melting triglycerides, principally stearin, as compared to the filtrate which is principally olein, as shown in FIGS. 1 and 2, which are differential scanning calorimeter plots for the stearin and olein fractions, respectively.

Figure 3:
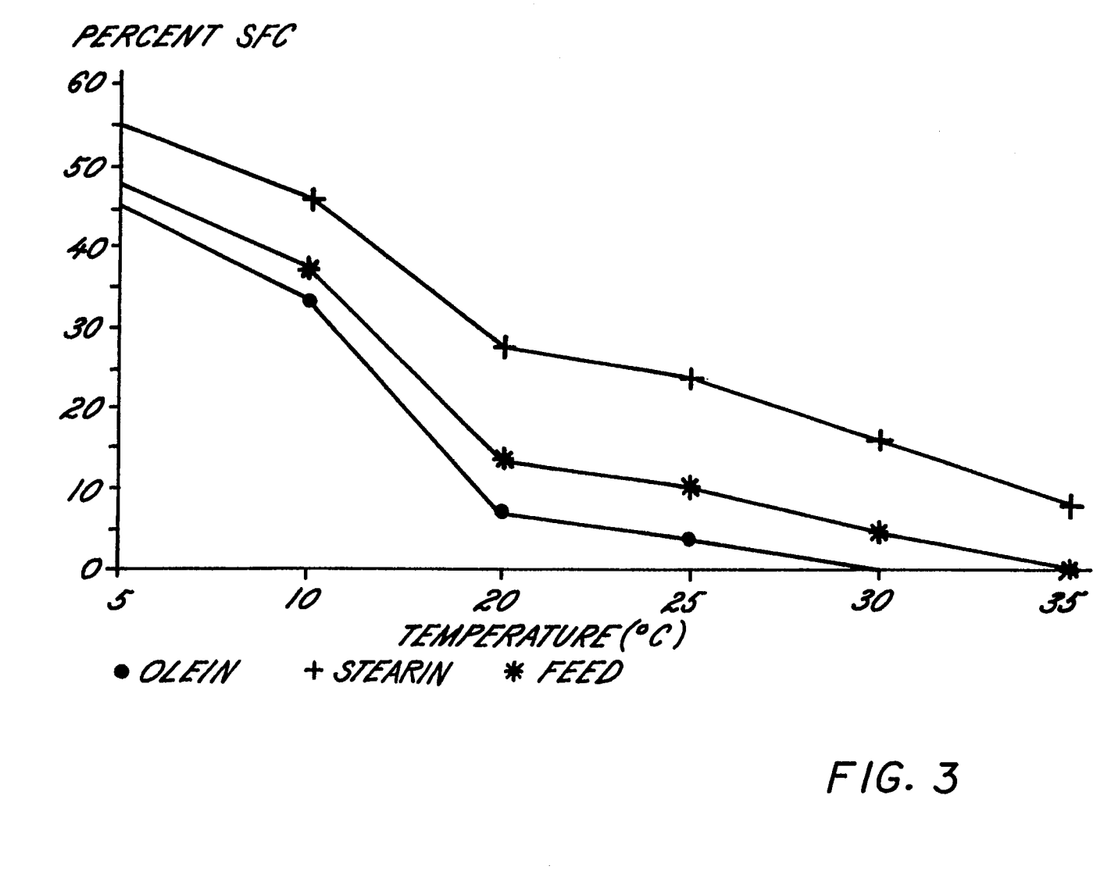
FIG. 3 is a graph showing the percent of solid fat components ("SFC") that are present at the specified temperature conditions, for a butterfat feed composition, the stearin composition of FIG. 1, and the olein example of FIG. 2., as determined by pulsed NMR.

FIG. 3 shows the results of the solid fat content (SFC) analysis conducted on the samples from this example, as determined by pulsed NMR. It is clear that the stearin has a higher SFC at various temperatures, when compared to the feed, whereas the filtrate, olein, has a significantly lower SFC.

EXAMPLES 1-2

Dead End Filtration

Example 1

To determine the effect of crystallization conditions on traditional dead end filtration, three experiments were conducted. Three pounds of butteroil was pretreated using Method A. This was then separated into three portions of 1 pound each and was crystallized using Methods B1, B2 and B3. The crystallization temperature was maintained at 25° C. in each case. The pretreated butter was then subjected to filtration using a 90 mm pressure filtration jig which was equipped with a 0.65 micron Ultipor ® membrane. In all three cases only a few drops of olein permeated the membrane before the pressure built up too high to continue filtration.

Example 2

Example 1 was repeated using a larger pore size membrane, 10 micron HDC. In this case it was found that the total volume of filtrate was greatest, 95 ml, for the oil cooled by Method B3. The other two methods of cooling provided almost the same total filtrate volumes of about 65 ml.

Examples 1 and 2 show that independent of the manner in which the oil is cooled, upon operating in the dead end filtration mode, the filtrate flux will decline to zero due to the formation of a cake on the membrane surface. The smaller the pore size of the membranes, the more quickly that plugging of the membrane occurs.

EXAMPLES 3-7

Flux Rates and Quality at Different Filtration Temperatures and by Using Different Pore Size Membranes Example 3

Ten pounds of butteroil was pretreated according to Method A and then crystallized to a temperature of 29° C. by Method B1. The butter was cooled at a rate of about 1° C./min from 60° C. to 26° C. The conditions were further maintained for the next 30 minutes during which time the butter attained a temperature of 28° C. At the end of this holding period, the temperature treated butter was pumped into the dynamic microfilter at a rate of about 0.35 lb/min. A metal membrane filter element, PMM, with a pore size of 2.0 micron was assembled in the dynamic filter. The dynamic filter was operated as previously described.

Typical operating conditions were a rotational speed of 600 rpm, 120 m/min tangential velocity and 4-5 bar filtration pressure. Other process conditions are given in Table 1. The filtration temperature was maintained at about 28° C., by manipulating the coolant in the dynamic microfilter jacket. Filtration continued until the butter supply was exhausted. The filtrate and concentrate were collected in separate containers, individual flow rates and stream temperatures were monitored every few minutes. An average of these values and the solid fat content data are reported in Table 2.

Example 4

Example 3 was repeated with the exception that the filtration temperature was lowered to 25° C. The processing conditions are reported in Table 1. The flux and solid fat content data are provided in Table 2.

Example 5

Example 3 was repeated with the exception that a polymeric membrane of 1.0 micron pore size was used. The holding time of crystallization was 1 hour and the filtration temperature was 29° C. The processing conditions are reported in Table 1. The flux and solid fat content data are provided in Table 3.

Example 6

Example 5 was repeated except that a filtration temperature of 26° C. was used. The processing conditions are reported in Table 1. The flux and solid fat content data are provided in Table 3.

Example 7

Example 4 was repeated except that a 0.1 micron membrane acted as the separation media. The processing conditions are reported in Table 1. The flux and solid fat content data are provided in Table 4.

Examples 3 and 4 were run at similar conditions except for the lower filtration temperature used in Example 4. As shown in Table 2, the production rate is affected by the processing temperature. The filtration temperature also was shown to have an effect on product quality. In Example 3, there was an 11% change in filtrate fraction and a 24% change in concentrate fraction. By operating at a lower temperature, as in Example 4, the difference was changed to 17% and 46%, respectively.

Similar results are noted when comparing Examples 5 and 6 which were run with polymeric membranes under identical conditions except for filtration temperature. The effect of temperature is particularly drastic in the case of butter, because the solid fat content can increase from about 2% at 32° C. to about 60% at 15° C.

The effect of using membranes of different pore size can be estimated by comparing Examples 4, 6 and 7. As expected, the filtrate flux rates are reduced as one uses membranes with a smaller pore size. This reduction is roughly in the same ratio of the reduction of clean water flux, showing that the effect is purely due to the increased resistance of smaller pore size membranes.

The quality of the products is improved when smaller pore size membranes are used. Tables 2, 3 and 4 show that the filtrate quality does dramatically increase upon using smaller pore size membranes. The quality of the concentrate fraction is not completely dependent on the pore size of the membrane used, but is a strong function of the axial velocity used. The lower number for solid fat content in Example 7, in comparison to Example 6, is apparently due to the use of increased axial velocity, which is believed to have caused some liquid fraction to be entrained with the concentrate.

TABLE 1

| Process conditions for Examples 3–7 | | | | | |
|---|---|---|---|---|---|
| | Example # | | | | |
| | 3 | 4 | 5 | 6 | 7 |
| φ(T)(SFC @ 25° C.) | 10.6 | 10.6 | 10.6 | 10.6 | 10.6 |
| Ω % | 0.0 | 0.0 | 0.0 | 0.0 | 0.0 |
| $C_r$C/min | 1.0 | 1.0 | 1.0 | 1.0 | 1.0 |

TABLE 1-continued

| Process conditions for Examples 3–7 | | | | | |
|---|---|---|---|---|---|
| | Example # | | | | |
| | 3 | 4 | 5 | 6 | 7 |
| $\tau_h$ min | 30 | 30 | 60 | 60 | 60 |
| $T_f$C | 28 | 25 | 29 | 26 | 25 |
| $P_f$bar | 5–6 | 5–6 | 6–7 | 6–7 | 6–8 |
| $V_r$m/min | 120 | 120 | 120 | 120 | 120 |
| Ψ micron | 2.0 | 2.0 | 0.45 | 0.45 | 0.10 |

TABLE 2

Effect of filtration temperature on permeation rates and the quality of the fractions produced using metal membranes

| | Example 3 Filtration Temp 28° C. | | Example 4 Filtration Temp 25° C. | |
|---|---|---|---|---|
| | filtrate | concentrate | filtrate | concentrate |
| flow rate lb/min/m² | 6.1 | 1.8 | 4.8 | 1.4 |
| SFC @ 25° C. | 9.4 | 13.2 | 8.8 | 15.5 |
| DSC J/gm @ 6° C. | 0.6 | 0.59 | 0.34 | 1.25 |
| DSC J/gm @ 24° C. | 4.27 | 5.91 | 1.74 | 16.5 |

TABLE 3

Effect of filtration temperature on permeation rates and the quality of the fractions produced using polymeric membranes

| | Example 5 Filtration Temp 29° C. | | Example 6 Filtration Temp 26° C. | |
|---|---|---|---|---|
| | filtrate | concentrate | filtrate | concentrate |
| flow rate lb/min/m² | 1.75 | 0.43 | 0.64 | 0.31 |
| SFC @ 25° C. | 8.4 | 16.15 | 4.55 | 20.80 |

TABLE 4

| | Example 7 Membrane Pore Size 0.1 Micron | |
|---|---|---|
| | filtrate | concentrate |
| flow rate lb/min/m² | 0.16 | 0.83 |
| SFC @ 25° C. | 0 @ 20° C. | 16.21 |

EXAMPLES 8, 9A AND 9B

Multiple Fractionations

Example 8

Example 4 was repeated, except that the feed was the filtrate fraction of Example 4, and not regular butteroil. The processing conditions are given in Table 5. The data from the example is reported in Table 6.

Example 9A

Example 4 was repeated and the data is reported in Table 9. The filtrate was collected to serve as feed material for Example 9B.

Example 9B

Example 9A was repeated, except that the feed material used was the filtrate from Example 9A and the membrane used had a pore size of 0.65 micron. The data is reported in Table 5.

TABLE 5

| Process conditions for multiple fractionation experiments | | | |
|---|---|---|---|
| | Example # | | |
| | 8 | 9A | 9B |
| φ(T)(SFC @ 25° C.) | 8.8 | 10.6 | 9.56 |
| Ω % | 0.0 | 0.0 | 0.0 |
| $C_r$C/min | 1.0 | 1.0 | 1.0 |
| $\tau_h$ min | 30 | 30 | 60 |

TABLE 5-continued

Process conditions for multiple fractionation experiments

| | Example # | | |
|---|---|---|---|
| | 8 | 9A | 9B |
| $T_fC$ | 25 | 25 | 25 |
| $P_f$ bar | 5–6 | 5–6 | 6–8 |
| $V_r$ m/min | 120 | 120 | 120 |
| Ψ micron | 2.0 | 2.0 | 0.65 |

TABLE 6

| | Example 4 | | Example 8 | | Feed Characteristics |
|---|---|---|---|---|---|
| | filtrate | concentrate | filtrate | concentrate | |
| flow rate lb/min/m² | 4.8 | 1.35 | 5.75 | .95 | |
| Iodine value | 33.51 | 28.66 | 31.41 | 30.36 | 33.0 |
| SFC @ 25° C. | 8.81 | 15.15 | 7.02 | 13.04 | 10.6 |

TABLE 7

| | Example 9A | | Example 9B | | Feed Characteristics |
|---|---|---|---|---|---|
| | filtrate | concentrate | filtrate | concentrate | |
| flow rate lb/min/m² | 4.8 | 1.35 | 0.13 | 2.6 | |
| Iodine value | 30.7 | 31.71 | 34.93 | 30.65 | 33.0 |
| SFC @ 25° C. | 9.56 | 14.15 | 0.0 | 9.11 | 0.6 |

Examples 8, 9A and 9B show that a single feed stream can be processed in several different ways to produce various fractions of substantially different properties. In the case of Example 9B, the filtrate fraction is substantially different from the original feed stream of Example 9A.

These Examples also show that by selecting the proper filtration temperature and pore size of the membrane being used, the properties of the fractions could be tailored according to need.

EXAMPLES 10–11

Effect of Addition of Water

Example 10

Example 4 was repeated with the exception that 4%, by weight, water was added to the butterfat before temperature treatment and a filtration pressure of 2 bar was used. The data is shown in Table 8. By comparison with Example 4, it can be clearly seen that the degree of fractionation is improved when water is added.

TABLE 8

Effect of water on fractionation quality using 2 micron metal membranes

| | Example 10 | | Example 4 | | Feed Characteristics |
|---|---|---|---|---|---|
| | filtrate | concentrate | filtrate | concentrate | |
| flow rate lb/min/m² | 4.7 | 1.6 | 4.8 | 1.4 | |
| SFC @ 25° C. | 3.86 | 15.83 | 8.8 | 15.5 | 10.6 |

Example 11

Example 6 was repeated with the exception that 4%, by weight, water was added to the butterfat before temperature treatment, and a filtration pressure of 2 bar was used. The data is shown in Table 9.

TABLE 9

Effect of water on quality of fractionation using 0.45 micron teflon membranes

| | Example 11 | | Example 6 | | Feed Characteristics |
|---|---|---|---|---|---|
| | filtrate | concentrate | filtrate | concentrate | |
| flow rate lb/min/m² | 0.2 | 0.7 | 0.64 | 0.31 | |
| SFC @ 25° C. | 0 | 12.37 | 4.55 | 20.80 | 10.6 |

Examples 4 and 10 were run at identical conditions except that water was added in Example 10 and a lower filtration pressure was used. Table 8 shows that the filtrate flux per unit pressure drop increased, upon adding water to the fat. A dramatic increase in filtrate quality is also seen. A comparison of Examples 6 and 11 show similar results. It is noted that the concentrate fraction of Example 11 has a lower quality than Example 6, which may have been due to the partial entrainment of liquid in the concentrate, due to poor control on the axial velocity during the experiment.

EXAMPLE 12

Example 4 was repeated except that a 10 micron membrane filter element was used. No significant changes were seen in the filtrate and concentrate fraction when compared with the feed stream. Thus, membranes with a 10 micron pore size, or larger, are obviously too large to be of partical utility in the present invention.

What is claimed is:

1. A method for fractionating a fat composition containing a mixture of fatty glycerides into two or more fractions, comprising heating the fat composition to a temperature at which all of the fatty glycerides are in a liquid state, cooling the liquified fat composition to a predetermined temperature at which at least a portion of the fatty glycerides are present as solids, said cooling being at a cooling rate of at least about 0.5° C. per minute, to form a suspension of crystals of said portion of fatty glycerides, said crystals having particle sizes from about 0.1 to about 50 microns, and filtering the resulting suspension using dynamic microfiltration to form a first filtrate that is substantially free of said crystals and a first concentrate having an increased concentration of said crystals by feeding the suspension to a membrane surface of a dynamic microfilter, said dynamic microfiltration being performed under conditions so that the suspension being filtered has imparted to it a secondary velocity component that is tangential to the membrane surface and that is independent of the feed rate of the suspension.

2. The method of claim 1 in which the filtrate retains the olfactory and gustatory characteristics of the original fat composition.

3. The method of claim 1 wherein the fat composition is butter.

4. The method of claim 1 wherein the suspension of fatty glyceride crystals is filtered through a microporous filter having an effective pore diameter from about 0.2 to about 0.65.

5. The method of claim 4 wherein the filtration through the membrane is at a flux rate of at least about 100 lb/hr/m².

6. The method of claim 1 wherein the time from initiation of cooling to removal of the fatty glyceride crystals is about 1 hour, or less.

7. The method of claim 6 wherein the fat composition is heated to a temperature from about 45° to about 75°.

8. The method of claim 7 wherein the fat composition is maintained at the elevated temperature for less than about 10 minutes.

9. The method of claim 1 wherein the first concentrate is heated to a temperature at which all of the remaining components are in a liquid state, cooling the liquified first concentrate to a predetermined temperature at which at least a portion of the fatty glycerides are present as solids, said cooling being at a cooling rate of at least about 2° C. per minute, to form a suspension of crystals of said portion of fatty glycerides, said crystals having particle sizes from about 0.1 to about 50 microns, and filtering the resulting suspension to form a second filtrate that is substantially free of said crystals and a second concentrate having an increased concentration of said crystals.

10. The method of claim 9 wherein the fractionation method is repeated for the second concentrate, to form a third filtrate and a third concentrate.

11. The method of claim 10 wherein the starting fat composition is selected from the group consisting of babassau, castor, coconut, corn, cottonseed, linseed, oiticica, olive, palm, palm kernel, peanut, rapeseed, safflower, sesame, soybean, sunflower, rice bran, tsubaki, perilla, hemo seed, kapok, tea seed, tung, butter, lard, tallow, whale, herring, sardine and menhaden.

12. The method of claim 1, wherein, prior to the filtration step, the filter is first saturated with a hydrophobic material, water is added to the liquified fat composition prior to filtration, and the liquified fat composition containing said water is filtered by a filter that has been saturated with a hydrophobic material, the filtration being at a pressure that does not exceed a critical breakthrough pressure at which the hydrophobic material would be displaced from the filter, and water allowed to pass therethrough.

13. The method of claim 12 wherein the fat composition is selected from the group consisting of babassau, castor, coconut, corn, cottonseed, linseed, oiticica, olive, palm, palm kernel, peanut, rapeseed, safflower, sesame, soybean, sunflower, rice bran, tsubaki, perilla, hemo seed, kapok, tea seed, tung, butter, lard, tallow, whale, herring, sardine and menhaden.

14. A method for reducing the bacterial content of a fat composition consisting essentially of fat containing bacteria, comprising heating the fat composition to a temperature at which all of the fatty glycerides are in a liquid state, and filtering the liquified fat composition using dynamic microfiltration to form a first filtrate that has a reduced content of bacteria and a concentrate having an increased concentration of bacteria by feeding the liquified fat to a membrane surface of a dynamic microfilter, said dynamic microfiltration being performed under conditions so that the liquified fat being filtered has imparted to it a secondary velocity component that is tangential to the membrane surface and that is independent of the feed rate of the suspension.

15. The method of claim 14 in which the filtrate retains the olfactory and gustatory characteristics of the original fat composition.

16. The method of claim 14 wherein the fat composition is butter.

17. The method of claim 14 wherein the liquified fat composition is filtered through a microporous filter having an effective pore diameter from about 0.2 to about 0.65.

18. The method of claim 14 wherein the fat composition is selected from the group consisting of babassau, castor, coconut, corn, cottonseed, linseed, oiticica, olive, palm, palm kernel, peanut, rapeseed, safflower, sesame, soybean, sunflower, rice bran, tsubaki, perilla, hemo seed, kapok, tea seed, tung, butter, lard, tallow, whale, herring, sardine and menhaden.

* * * * *

UNITED STATES PATENT AND TRADEMARK OFFICE
CERTIFICATE OF CORRECTION

PATENT NO. : 5,395,531
DATED : MARCH 7, 1995
INVENTOR(S) : PETER J. DEGEN, TONY ALEX AND JOSEPH W. DEHN, JR.

It is certified that error appears in the above-indentified patent and that said Letters Patent is hereby corrected as shown below:

ON THE TITLE PAGE:

[75] Inventors: "Peter D. Degen", should read -- Peter J. Degen --;

[56] References Cited

U.S. PATENT DOCUMENTS

"5,166,375  11/1992  Suzuki et al." should read -- 5,166,376  11/1992  Suzuki et al. --.

Column 4, line 7, delete "an" and substitute therefor -- and --; and

Column 13, Table Continued, line 9, insert "Ψ" as the symbol for "membrane pore size in μm".

Signed and Sealed this

Twenty-seventh Day of June, 1995

Attest:

BRUCE LEHMAN

Attesting Officer

Commissioner of Patents and Trademarks